(12) United States Patent
Chun et al.

(10) Patent No.: US 8,804,637 B2
(45) Date of Patent: Aug. 12, 2014

(54) METHOD FOR TRANSMITTING A MIDAMBLE IN A RADIO COMMUNICATION SYSTEM

(75) Inventors: Jin Young Chun, Gyeongki-do (KR); Woo Suk Kwon, Gyeongki-do (KR); Wook Bong Lee, Gyeongki-do (KR); Bin Chul Ihm, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 444 days.

(21) Appl. No.: 13/146,523

(22) PCT Filed: Jan. 27, 2010

(86) PCT No.: PCT/KR2010/000480
§ 371 (c)(1),
(2), (4) Date: Jul. 27, 2011

(87) PCT Pub. No.: WO2010/087609
PCT Pub. Date: Aug. 5, 2010

(65) Prior Publication Data
US 2011/0286541 A1 Nov. 24, 2011

Related U.S. Application Data

(60) Provisional application No. 61/148,046, filed on Jan. 28, 2009.

(30) Foreign Application Priority Data

Jul. 24, 2009 (KR) ........................ 10-2009-0067563

(51) Int. Cl.
*H04J 11/00* (2006.01)
*H04W 4/00* (2009.01)
*H04B 15/00* (2006.01)

(52) U.S. Cl.
USPC ........... 370/329; 370/203; 370/430; 375/260; 455/501

(58) Field of Classification Search
USPC ................. 370/203–208, 230–336, 347–503; 375/140–260; 455/501–565
See application file for complete search history.

(56) References Cited

U.S. PATENT DOCUMENTS 5,005,169 A 4/1991 Bronder et al.
6,339,612 B1 * 1/2002 Stewart et al. ................ 375/140
(Continued)

FOREIGN PATENT DOCUMENTS

| KR | 2004-0044267 | 5/2004 |
| KR | 2007-0091230 | 9/2007 |
| KR | 10-0830163 B | 5/2008 |

OTHER PUBLICATIONS

International Search Report from PCT/KR2010/000480 (PCT corresponding to present application).

*Primary Examiner* — Man Phan
(74) *Attorney, Agent, or Firm* — Morgan, Lewis & Bockius LLP

(57) ABSTRACT

A method for transmitting a midamble in a radio communication system is provided. The method includes: allocating a radio resource of a carrier for the midamble, and transmitting the midamble by using the allocated radio resource, wherein the carrier includes a used band allocated for transmitting a signal and a guard band allocated for preventing interference from occurring in the used band, and the midamble is allocated to a radio resource including the guard band. Accordingly, a midamble which can be used in both a user equipment operating at a narrow band and a user equipment operating at a wide band can be transmitted when a radio communication system is in a multi-carrier mode. Further, the midamble can be transmitted also in a guard band, thereby improving accuracy of channel estimation.

10 Claims, 20 Drawing Sheets

(56) References Cited

U.S. PATENT DOCUMENTS

| | | | |
|---|---|---|---|
| 6,567,374 B1* | 5/2003 | Bohnke et al. | 370/203 |
| 7,411,897 B2* | 8/2008 | Yoo et al. | 370/208 |
| 7,688,926 B2* | 3/2010 | Suh et al. | 375/360 |
| 7,697,486 B2* | 4/2010 | Lee et al. | 370/335 |
| 7,701,916 B2* | 4/2010 | Dabak et al. | 370/342 |
| 7,839,880 B2* | 11/2010 | Seki | 370/430 |
| 7,907,573 B2* | 3/2011 | Lee et al. | 370/334 |
| 8,180,354 B2* | 5/2012 | Li et al. | 455/447 |
| 2003/0031145 A1* | 2/2003 | Zeira et al. | 370/335 |
| 2003/0035394 A1* | 2/2003 | Zeira et al. | 370/335 |
| 2004/0114507 A1 | 6/2004 | Yoo et al. | |
| 2006/0240838 A1 | 10/2006 | Suh et al. | |
| 2007/0297323 A1 | 12/2007 | Seki | |
| 2010/0074127 A1* | 3/2010 | Xiao et al. | 370/252 |

* cited by examiner

METHOD FOR TRANSMITTING A MIDAMBLE IN A RADIO COMMUNICATION SYSTEM

The present application is a national stage of PCT International Application No. PCT/KR2010/000480, filed Jan. 27, 2010, and claims the benefit of U.S. Provisional Application No. 61/148,046, filed Jan. 28, 2009. The present national stage application also claims the benefit of Korean Patent Application No. 10-2009-0067563, filed Jul. 24, 2009.

TECHNICAL FIELD

The present invention relates to radio communications, and more particularly, to a method for transmitting a midamble in a radio communication system.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'. In addition, IEEE 802.16e (hereinafter, '802.16e') was approved in December, 2005.

At present, there is an ongoing effort to complete the IEEE 802.16m-"Air Interface for Fixed and Mobile Broadband Wireless Access Systems-Advanced Air Interface" standard (hereinafter, '802.16m') by 2010 as a new technical standard on the basis of the existing 802.16e. The newly developed technical standard, i.e., 802.16m, has to be designed so that the existing 802.16e can be also supported. That is, the technique (i.e., 802.16m) of a newly designed system has to be configured such that the system operates by effectively integrating the existing technique (i.e., 802.16e) (in terms of backward compatibility).

A multi-carrier mode is supported in the 802.16m. Herein, the support of the multi-carrier mode implies that a user equipment operating at a narrow band (e.g., 5 MHz) and a user equipment operating at a wide band (e.g., 20 MHz) are both supported. If one carrier frequency band is 5 MHz for example in the multi-carrier mode, four carriers can be combined to allocate a frequency band of 20 MHz to the user equipment operating at the wide band, thereby being able to support the user equipment operating at the wide band.

A plurality of carriers may exist in a frequency domain, and in order to prevent inter-carrier interference, a guard band exists in an edge portion of each carrier (in the frequency domain). In the existing 802.16e, the guard band was an empty band in which no data is transmitted. However, in a case where the multi-carrier mode is supported in the 802.16m, the guard band can be used for data transmission, and thus a signal for channel estimation has to be transmitted also in the guard band.

A midamble is a signal used for estimating a channel state. For example, in order to estimate a channel state for each antenna in a multiple-input multiple-output (MIMO) system which uses a plurality of antennas, a base station transmits a MIMO midamble. A user equipment receives the MIMO midamble to estimate the channel state for each antenna of the BS, and uses this estimation value to perform band selection, antenna selection, precoding matrix index determination, etc.

Accordingly, a method for transmitting a midamble in a multi-carrier mode is required.

SUMMARY OF INVENTION

Technical Problem

The present invention provides a method for transmitting a midamble in a radio communication system.

Technical Solution

According to an aspect of the present invention, a method for transmitting a midamble in a radio communication system is provided. The method includes: allocating a radio resource of a carrier for the midamble, and transmitting the midamble by using the allocated radio resource, wherein the carrier includes a used band allocated for transmitting a signal and a guard band allocated for preventing interference from occurring in the used band, and the midamble is allocated to a radio resource including the guard band.

According to another aspect of the present invention, a method for receiving a midamble in a radio communication system is provided. The method includes: receiving radio resource information regarding a radio resource to which the midamble is allocated in a carrier, and receiving the midamble from the radio resource recognized from the radio resource information, wherein the carrier includes a used band allocated for transmitting a signal and a guard band allocated for preventing interference from occurring in the used band, and the allocated radio resource includes the guard band.

Advantageous Effects

According to the present invention, a midamble which can be used in both a user equipment operating at a narrow band and a user equipment operating at a wide band can be transmitted when a radio communication system is in a multi-carrier mode. Further, the midamble can be transmitted also in a guard band, thereby improving accuracy of channel estimation.

MODE FOR INVENTION

Figure 1:
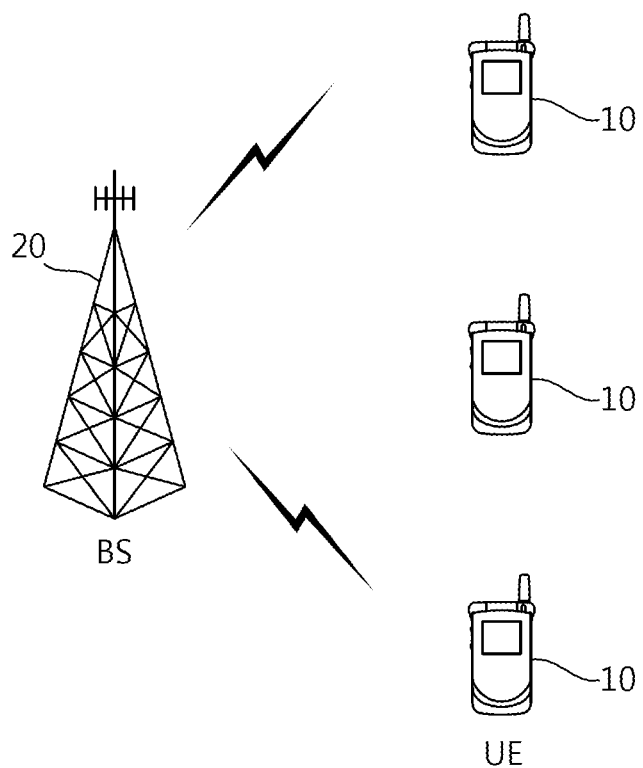
FIG. 1 shows a radio communication system.

FIG. 1 shows a radio communication system. The radio communication system can be widely deployed to provide a variety of communication services, such as voices, packet data, etc.

Referring to FIG. 1, the radio communication system includes a user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The UE 10 may operate at various frequency bands. For example, the UE 10 may operate at any one of frequency bands among 5, 7, 8.75, 10, and 20 MHz. The BS 20 is generally a fixed station that communicates with the UE 10 and may be referred to as another terminology, such as a node-B, a base transceiver system (BTS), an access point, etc. The BS 20 may transmit and receive a signal by using some or all of the various frequency bands at which the UE 10 operates. There are one or more cells within the coverage of the BS 20.

One cell can be divided into one or more sectors. That is, one cell may include one or more sectors. For effective system configuration, the radio communication system has a cell structure. A cell is a region in which a wide area is divided into small areas for effective frequency use. In general, the BS is installed in a center of the cell to relay the UE, and the cell corresponds to a service area of one BS. The same subcarrier may be used by neighbor cells of an orthogonal frequency division multiplexing (OFDM)/orthogonal frequency division multiple access (OFDMA) system in a multi-cell environment, and as a result, inter-cell interference may occur. The inter-cell interference occurs severely due to a UE located near a cell edge.

Hereinafter, a downlink (DL) denotes a communication link from the BS to the UE, and an uplink (UL) denotes a communication link from the UE to the BS. In the DL, a transmitter may be a part of the BS 20, and a receiver may be a part of the UE 10. In the UL, the transmitter may be a part of the UE 10, and the receiver may be a part of the BS 20.

The radio communication system may be a system based on OFDM/OFDMA. The OFDM uses a plurality of orthogonal subcarriers. Further, the OFDM uses an orthogonality between inverse fast Fourier transform (IFFT) and fast Fourier transform (FFT). The transmitter transmits data by performing IFFT on the data. The receiver restores original data by performing FFT on a received signal. The transmitter uses IFFT to combine the plurality of subcarriers, and the receiver uses FFT to split the plurality of subcarriers.

The radio communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched Tx diversity (FSTD), time switched Tx diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided based on frequency, and the TSTD is a scheme in which the signals transmitted to the multiple antennas are divided based on time. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
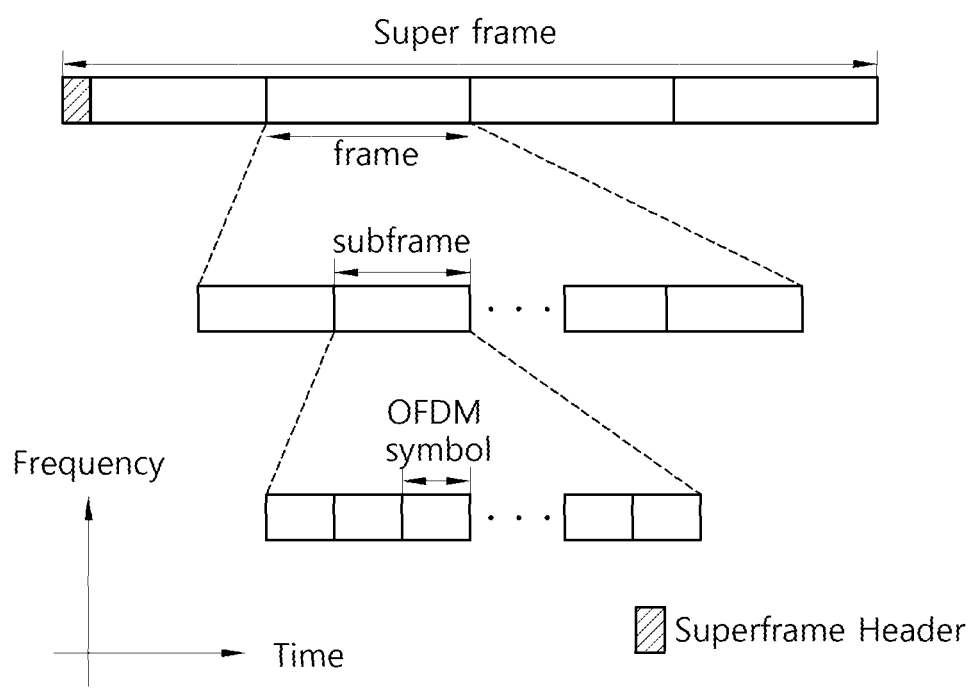
FIG. 2 shows an example of a radio frame structure used in a radio communication system.

FIG. 2 shows an example of a radio frame structure used in a radio communication system.

Referring to FIG. 2, a super frame may include at least one frame. Although it is shown herein that the super frame includes 4 frames, the number of frames included in the super frame is not limited thereto. A superframe header may be allocated to a first position in a time domain of the super frame. The superframe header may include system configuration information, frame configuration information within the super frame, etc.

The frame may include at least one subframe. The subframe includes a plurality of OFDM symbols in the time domain, and includes a plurality of subcarriers in a frequency domain. Such a subframe may include at least one resource unit (RU). A midamble for channel estimation (e.g., a MIMO midamble) may be allocated to the RU.

Figure 3:
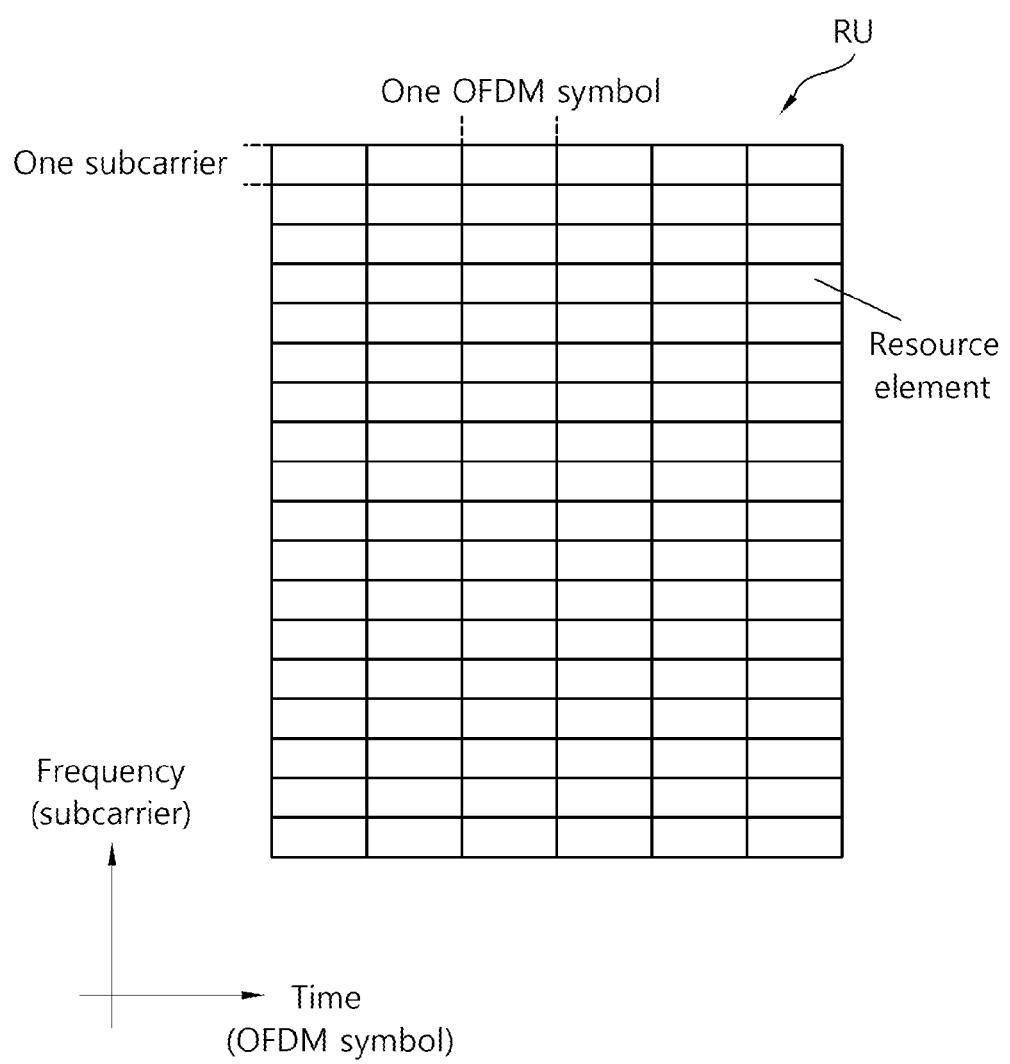
FIG. 3 shows a resource unit (RU).

FIG. 3 shows a resource unit (RU).

The RU shown in FIG. 3 is a basic unit of a radio resource allocated to one user. One or more RUs can be allocated to one user. The RU can be defined as a plurality of subcarriers in a frequency domain and a plurality of OFDM symbols in a time domain. For example, the RU can be defined as 18 contiguous subcarriers in the frequency domain, and can include 6 OFDM symbols in the time domain. A resource corresponding to one subcarrier in the frequency domain and one OFDM symbol in the time domain is referred to as a resource element. Then, the RU can be regarded as a combination of a plurality of resource elements.

Figure 4:
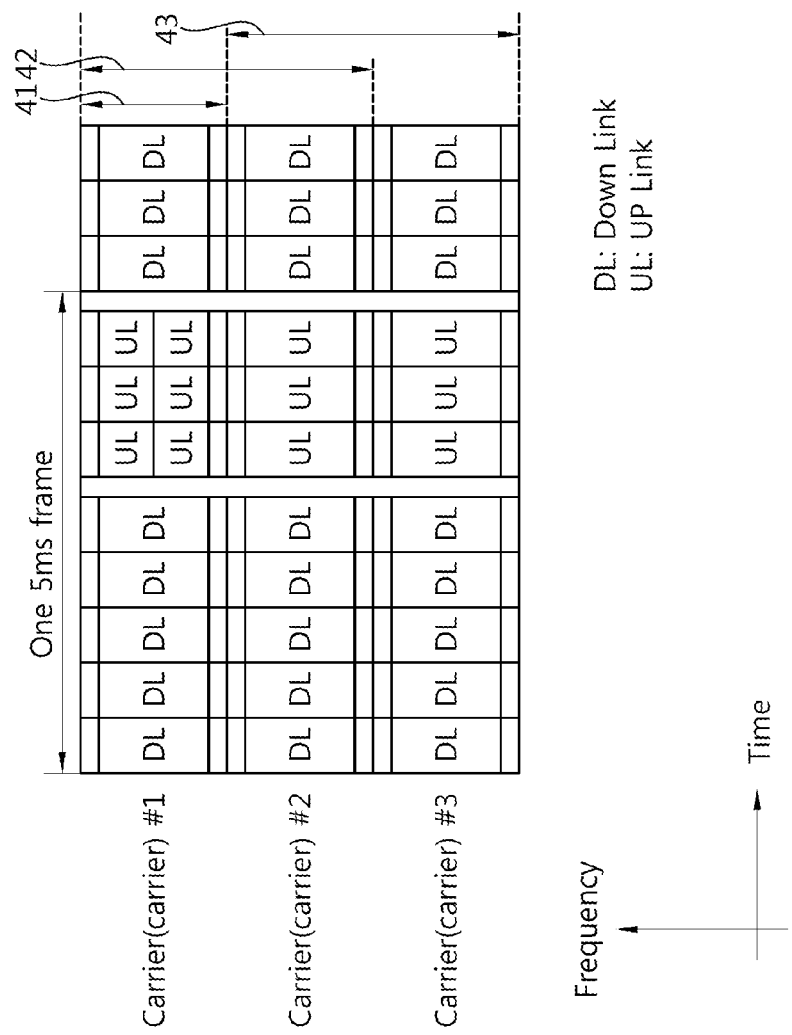
FIG. 4 shows a frame structure supporting a multi-carrier mode and a frequency band of a base station and a user equipment.

FIG. 4 shows a frequency band allocated to a UE when supporting a multi-carrier mode.

Referring to FIG. 4, each of a carrier #1 to a carrier #3 may have a frequency band of 5 MHz. In the multi-carrier mode, a BS can transmit a signal across all of the carriers #1, #2, and #3. A UE operates at a different frequency band according to an operation frequency band supported by the UE. For example, the UE may be able to operate only for a specific carrier (e.g., the carrier #1) having a frequency band of 5 MHz (as indicated by 41), or may operate at 10 MHz (as indicated by 42 and 43). Although not shown in FIG. 4, the UE is able to operate at another frequency band, e.g., any one of bands among 7, 8.75, and 20 MHz. Time and frequency synchronizations have to be matched between carriers, and have a difference corresponding to an integer multiple of a subcarrier between the carriers.

Figure 5:
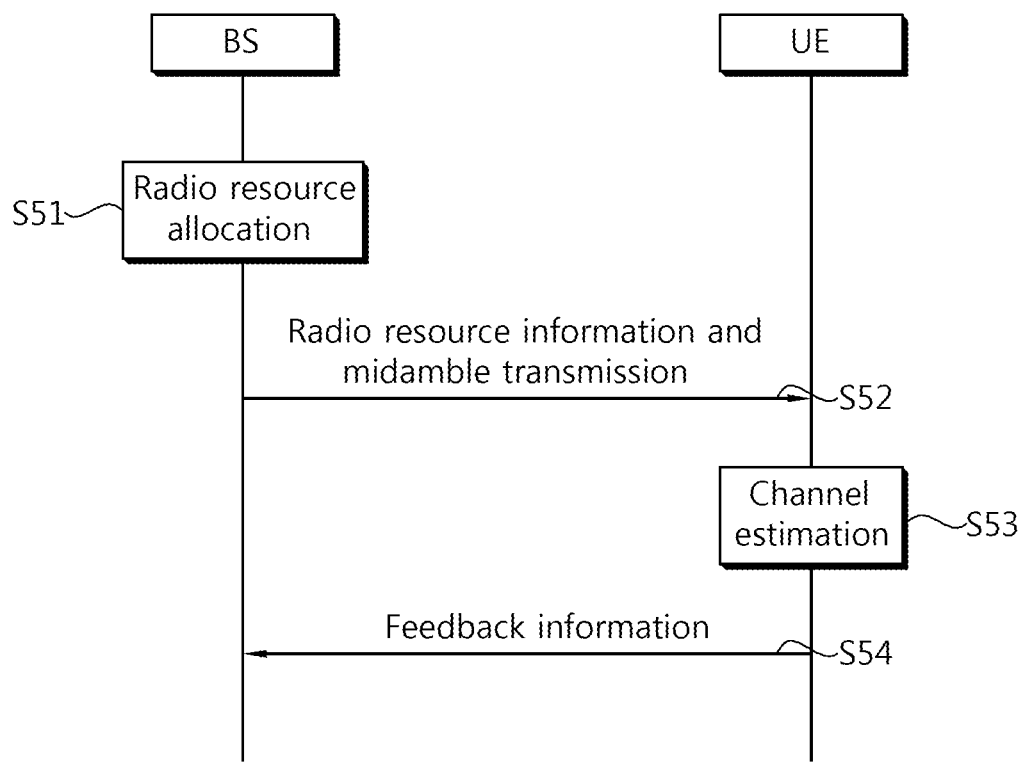
FIG. 5 is a flowchart showing a midamble transmission method in a radio communication system according to an embodiment of the present invention.

FIG. 5 is a flowchart showing a midamble transmission method in a radio communication system according to an embodiment of the present invention.

Referring to FIG. 5, a BS allocates a radio resource of a carrier for a midamble (step S51). The BS transmits radio resource information and the midamble by using the allocated radio resource (step S52). In this case, the midamble can be allocated to the radio resource including a guard band allocated for preventing interference from occurring in a used band. The used band is a frequency band allocated for transmitting a signal, and will be described below. A UE receives radio resource information regarding a radio resource to which the midamble is allocated in the carrier, and performs channel estimation by detecting the midamble recognized from the radio resource information (step S53). The UE feeds back a channel estimation value to the BS (step S54). Hereinafter, a method for allocating the radio resource for midamble transmission will be described.

Figure 6:
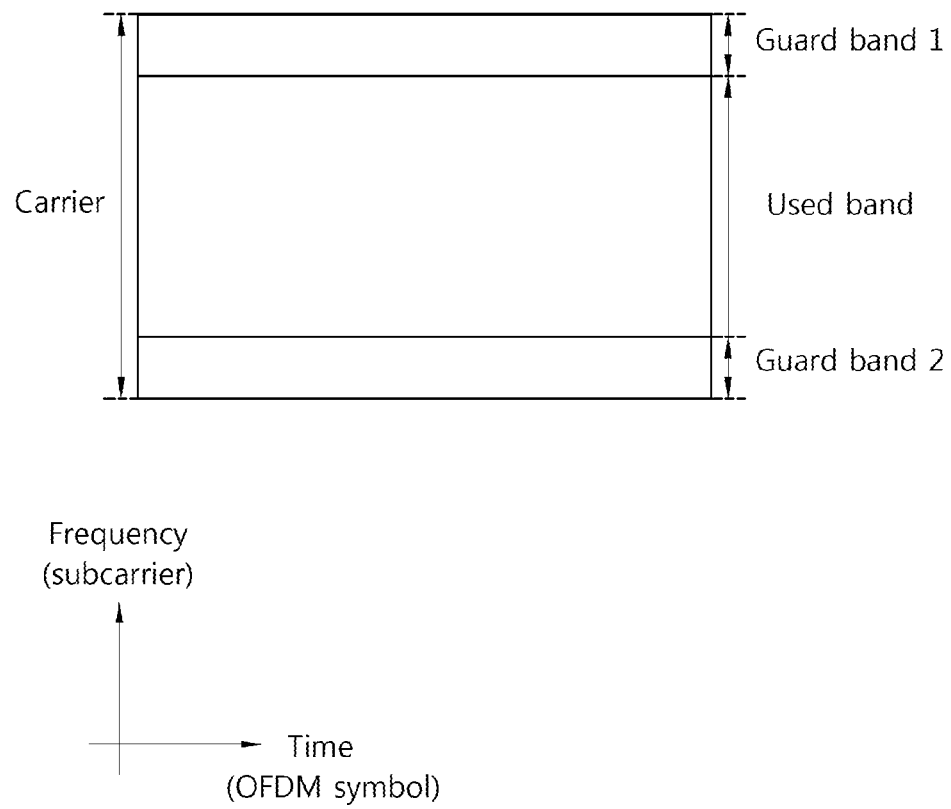
FIG. 6 shows an example of allocating a subcarrier for one carrier.

FIG. 6 shows an example of allocating a subcarrier for one carrier.

Referring to FIG. 6, the carrier may consist of a guard band 1, a used band, and a guard band 2. The used band is a region for data transmission or reception. The guard band 1 and the guard band 2 are a frequency band allocated for the purpose of preventing occurrence of interference with respect to another adjacent carrier. As will be described below, the guard band 1 and/or the guard band 2 can be used for data transmission or reception in a multi-carrier mode. That is, the guard band can be used for data transmission or reception similarly to the used band.

The following table shows the number of subcarriers used in the guard band 1, the guard band 2, and the used band, the number of RUs in use, and the like according to a carrier band.

In the table, 'The nominal channel bandwidth, BW' denotes the carrier band. In 'Number of Guard Sub-carriers', the number of subcarriers of the guard band 1 is denoted by 'Left', and the number of subcarriers of the guard band 2 is denoted by 'Right'. 'Number of Physical Resource Blocks' denotes the number of RUs included in a used band of each carrier. [TBD] indicates a state which is not defined yet.

|  |  | The nominal channel bandwidth, BW (MHz) | | | | |
| --- | --- | --- | --- | --- | --- | --- |
|  |  | 5 | 7 | 8.75 | 10 | 20 |
|  | Sampling factor, n | 28/25 | 8/7 | 8/7 | 28/25 | 28/25 |
|  | Sampling frequency, $F_s$ (MHz) | 5.6 | 8 | 10 | 11.2 | 22.4 |
|  | FFT size, $N_{FFT}$ | 512 | 1024 | 1024 | 1024 | 2048 |
|  | Subcarrier spacing, $\Delta f$ (kHz) | 10.94 | 7.81 | 9.77 | 10.94 | 10.94 |
|  | Useful symbol time, $T_h$ (us) | 91.4 | 128 | 102.4 | 91.4 | 91.4 |
| CP ratio, G = 1/8 | OFDMA symbol time, $T_s$ (us) | 102.82 | 144 | 115.2 | 102.82 | 102.82 |
|  | Number of OFDMA symbols per 5 ms frame | 48 | 34 | 43 | 48 | 48 |
|  | Idle time (us) | 62.86 | 104 | 46.40 | 62.86 | 62.86 |
| CP ratio, G = 1/16 | OFDMA symbol time, $T_s$ (us) | 97.143 | [TBD] | [TBD] | 97.143 | 97.143 |
|  | Number of OFDMA symbols per 5 ms frame | 51 | [TBD] | [TBD] | 51 | 51 |
|  | Idle time (us) | 45.71 | [TBD] | [TBD] | 45.71 | 45.71 |
| Number of Guard Sub-Carriers | Left | 40 | 80 | 80 | 80 | 160 |
|  | Right | 39 | 79 | 79 | 79 | 159 |
| Number of Used Sub-Carriers |  | 433 | 865 | 865 | 865 | 1729 |
| Number of Physical Resource Blocks (18 × 6) |  | 24 | 48 | 48 | 48 | 96 |

Figure 7:
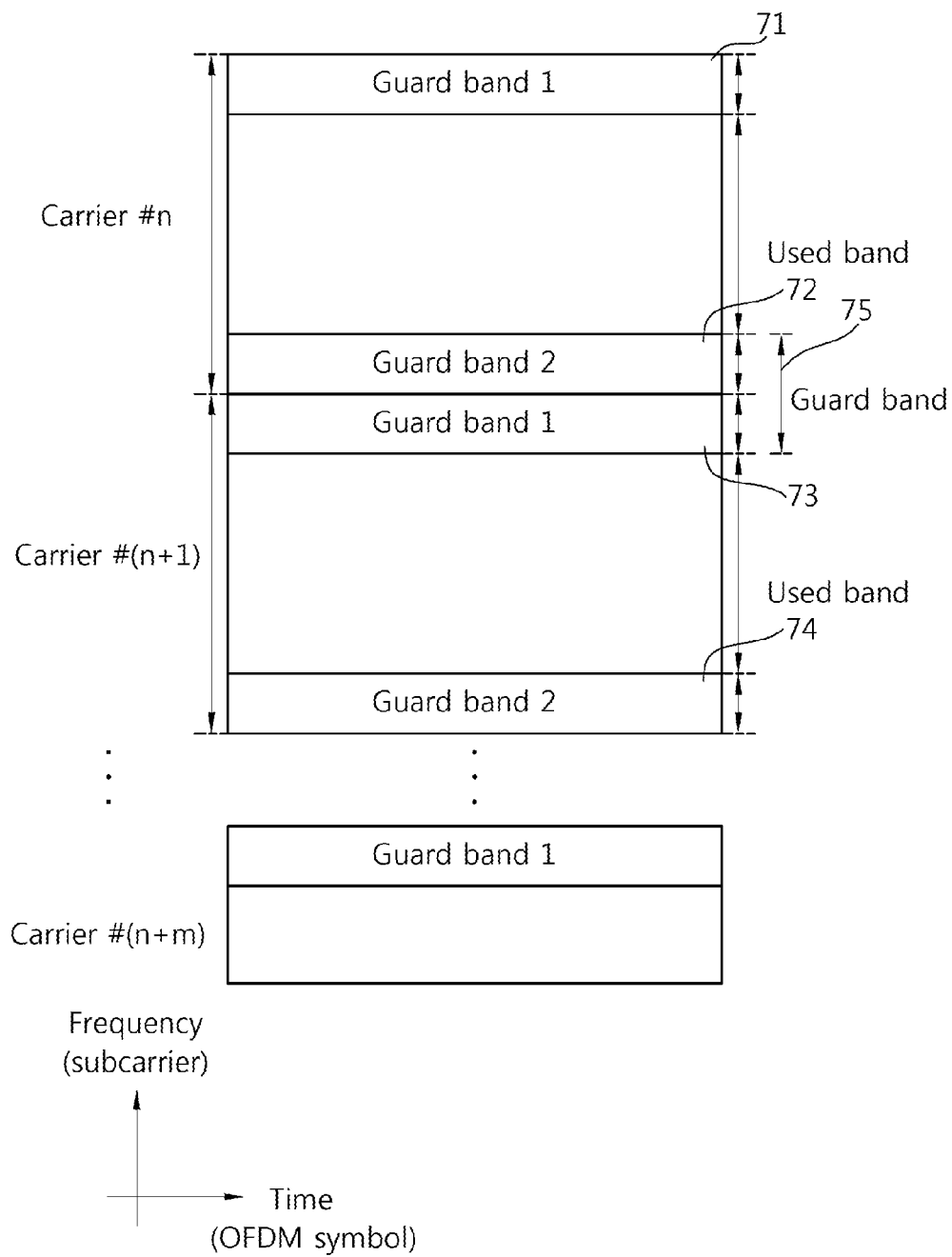
FIG. 7 shows two contiguous carriers.

FIG. 7 shows two contiguous carriers. Referring to FIG. 7, a guard band-2 72 of a carrier #n and a guard band-1 73 of a carrier #(n+1) are contiguous to each other. When the carrier #n and the carrier #(n+1) are allocated to one UE in a multi-carrier mode, the contiguous guard band-2 72 and guard band-1 73 can be used to transmit data to the UE similarly to a used band. For convenience of explanation, the guard band-2 72 and the guard band-1 73 are collectively referred to as a guard band 75. Then, if each carrier has a band of 5 MHz, the guard band includes 79 subcarriers in total (if a carrier band is any one of bands among 7, 8.75, and 10 MHz, the total number of subcarriers is 159, and if the band is 20 MHz, the total number of subcarriers is 319). Since an RU includes 18 subcarriers in a frequency domain, the guard band 75 includes 4 RUs and 7 subcarriers. The number of subcarriers allocated to the guard band 75 is not necessarily divided on an RU basis. The remaining subcarriers are referred to as residue subcarriers.

Figure 8:
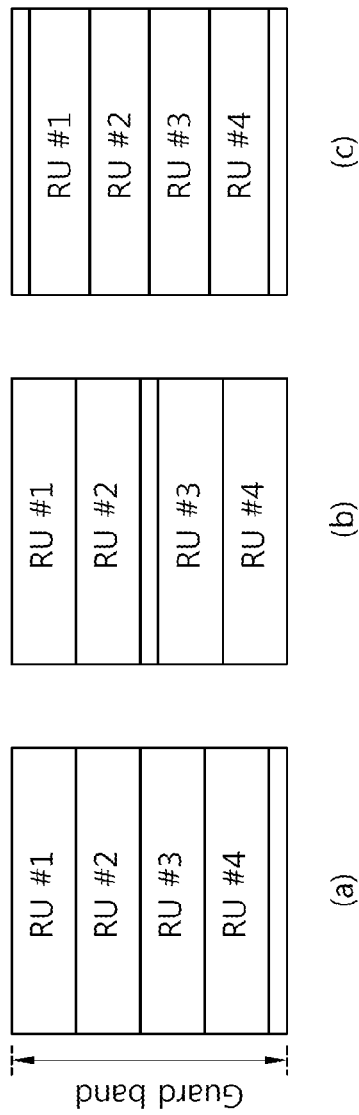
FIG. 8 shows an example of a method for allocating an RU for a guard band when a carrier band is 5 MHz.

FIG. 8 shows an example of a method for allocating an RU for a guard band when a carrier band is 5 MHz.

Referring to FIG. 8(a), a residue subcarrier is allocated to a lower edge of a guard band, and RUs #1 to #4 are allocated to the remaining parts. Referring to FIG. 8(b), a residue subcarrier is allocated to a middle part of a guard band, RUs #1 and #2 are allocated to an upper part, and RUs #3 and #4 are allocated to a lower part. Referring to FIG. 8(c), a residue subcarrier is allocated to both edges of a guard band along a frequency axis, and RUs #1 to #4 are allocated between residue subcarriers. Although a case where one carrier band is 5 MHz and two carriers are contiguous is described for example in FIG. 8, it is apparent that RUs can be allocated also in the same manner when the carrier band is 7, 8.75, 10, and 20 MHz. However, the number of RUs included in the guard band may change when the carrier band changes. For example, if the carrier band is 7, 8.75, and 10 MHz, the number of RUs included in the guard band is 8, and the number of residue subcarriers is 15. If the carrier band is 20 MHz, the number of RUs included in the guard band is 17, and the number of residue subcarriers is 13. If an even number of RUs are allocated by grouping the RUs, 16 RUs and 31 residue subcarriers can be allocated.

Figure 9:
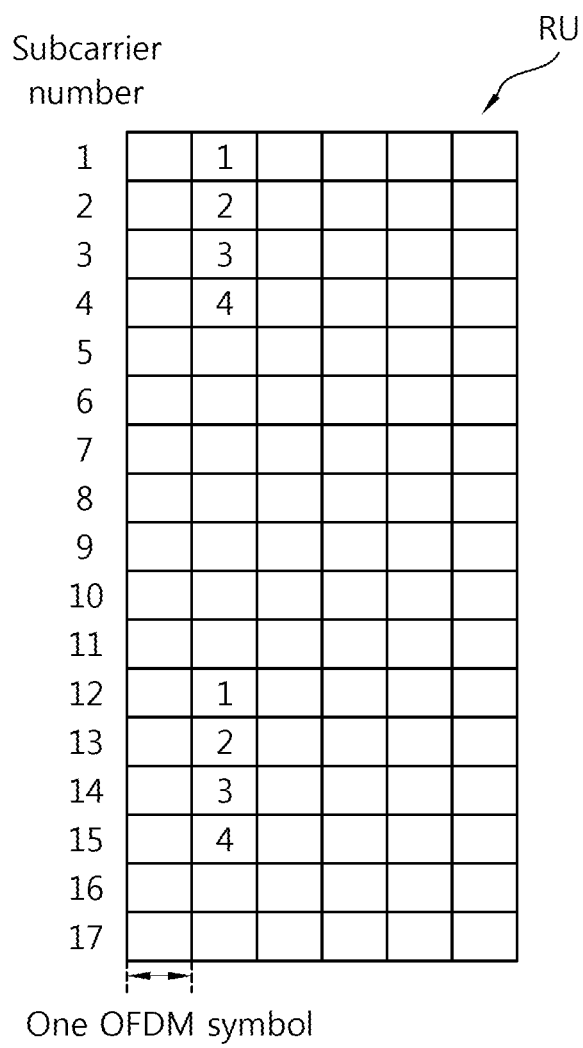
FIG. 9 shows an example of a method for allocating a multiple-input multiple-output (MIMO) midamble in an RU.

FIG. 9 shows an example of a method for allocating a MIMO midamble in an RU.

In FIG. 9, a number indicated in a resource element implies an antenna which is a target of channel estimation. That is, a resource element indicated by '1' implies that it is used in channel estimation for an antenna 1, and a resource element indicated by '2' implies that it is used in channel estimation for an antenna 2. A location of a resource element for each antenna may change variously. A signal transmitted from each antenna is subjected to frequency division multiplexing (FDM). A MIMO midamble is allocated only to any one OFDM symbol among 6 OFDM symbols constituting the RU. For example, the MIMO midamble can be allocated to a $2^{nd}$ OFDM symbol. In addition, MIMO midambles for respective antennas are allocated to contiguous subcarriers (herein, an order of the antennas is changeable), and are allocated in a pattern having a specific number of subcarriers (i.e., null subcarriers) to which the MIMO midambles are not allocated. Such a pattern can be repeated in a unit of 4 RUs. As described above, the number of RUs to which the MIMO midamble is allocated may be various according to a guard band. In addition, the RU to which the MIMO midamble is allocated may be used in each of a plurality of contiguous cells.

Figure 10:
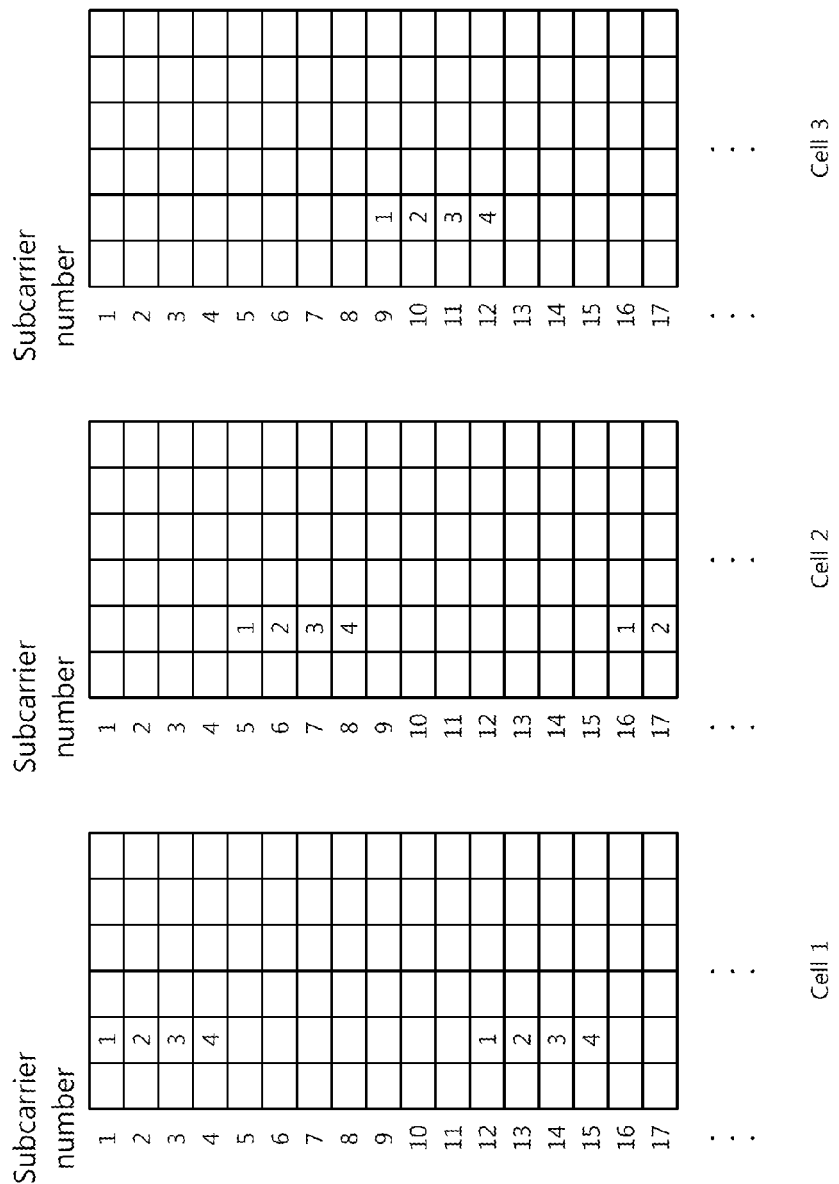
FIG. 10 shows a resource allocation method of a MIMO midamble that can be used in each of a plurality of cells.

FIG. 10 shows a resource allocation method of a MIMO midamble that can be used in each of a plurality of cells.

Referring to FIG. 10, subcarrier groups which are identified from each other can be allocated to respective midambles of a plurality of cells. For example, in a cell 1, a MIMO midamble is transmitted by using a subcarrier group having subcarrier numbers 1 to 4 and 12 to 15. In a cell 2, the MIMO midamble is transmitted by using a subcarrier group consisting of subcarrier numbers 5 to 8 and 16 to 19 (herein, subcarriers 18 and 19 are not shown). In a cell 3, the MIMO midamble is transmitted by using a subcarrier group having subcarrier numbers 9 to 12 (although not shown in the figure, the MIMO midamble is transmitted by using subcarrier numbers 20 to 23). The cells 1 to 3 may be contiguous to each other. In addition, although a plurality of cells are used herein for example, it is apparent that the present invention can also apply to a plurality of sectors when the plurality of sectors are present in one cell.

Hereinafter, a case where a pilot and a MIMO midamble are included in an RU will be described.

Figure 11:
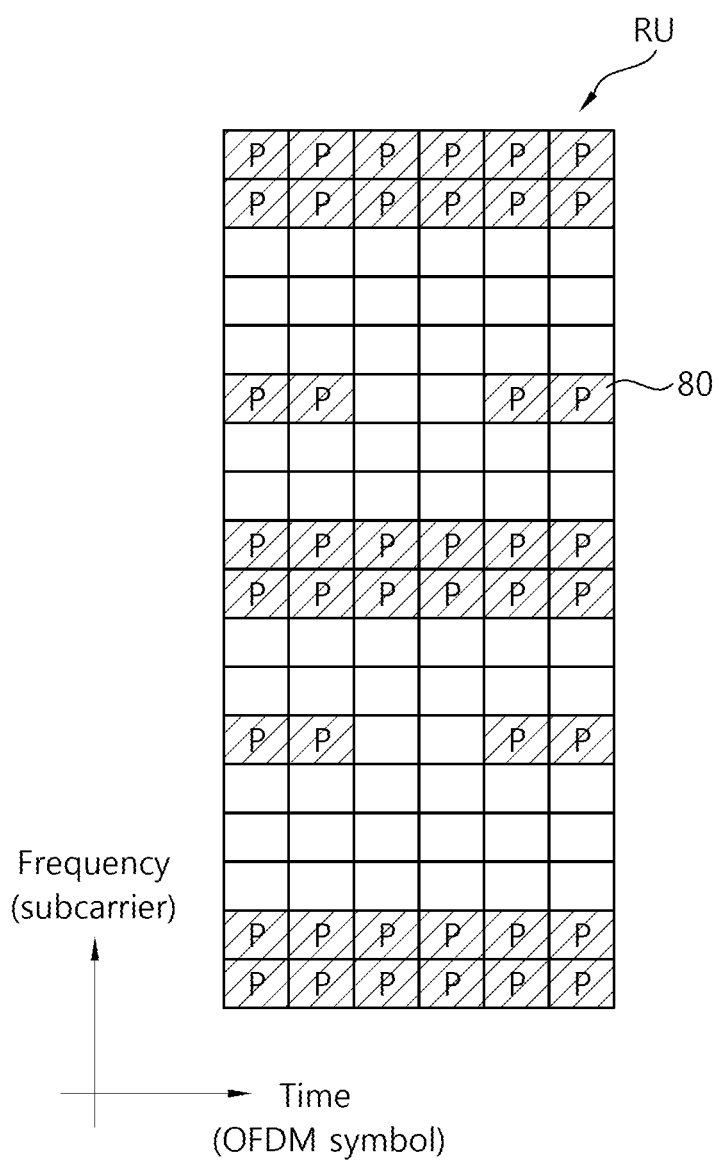
FIG. 11 is a diagram showing all possible locations at which a pilot can be allocated in an RU.

FIG. 11 is a diagram showing all possible locations at which a pilot can be allocated in an RU.

In FIG. 11, a resource element 80 indicated by P denotes a resource element to which a pilot signal can be allocated. The pilot signal can be used for channel estimation as a reference signal. The pilot signal can be allocated for some of resource elements indicated by P in a downlink. Resource elements to which the pilot signal can be allocated may be the same as shown in FIG. 11. Therefore, resource elements except for the resource elements indicated by P in FIG. 11 can be allocated for a midamble (e.g., a MIMO midamble). The MIMO midamble may consist of different sequences which identify antennas in a multiple antenna system.

Figure 12:
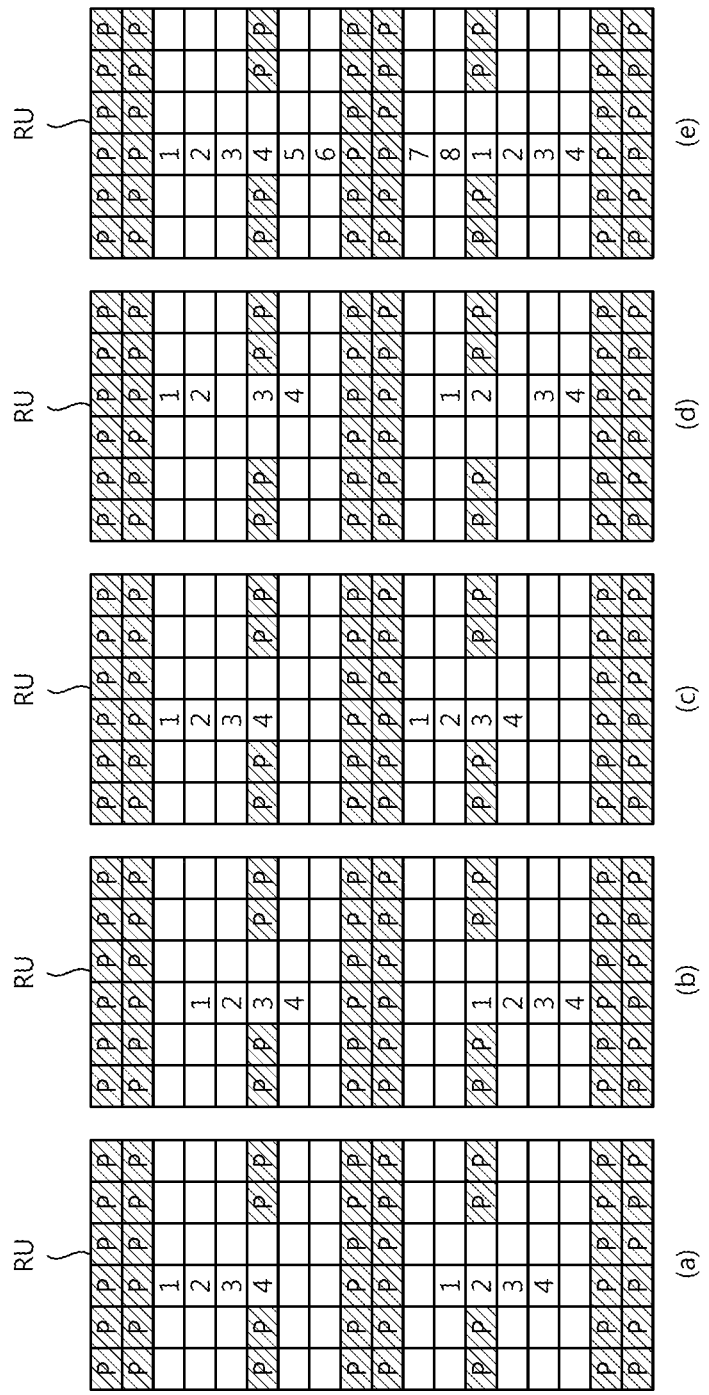
FIG. 12 shows an example of resource allocation of a MIMO midamble in an RU.

FIG. 12 shows an example of resource allocation of a MIMO midamble in an RU.

In FIG. 12(a) to FIG. 12(e), a number indicated in a resource element implies an antenna which is a target of channel estimation. That is, a resource element indicated by '1' implies that it is used in channel estimation for an antenna 1, and a resource element indicated by '2' implies that it is used in channel estimation for an antenna 2. That is, a case where two resource elements are allocated for each antenna (i.e., antennas 1 to 4) in one RU is shown in FIG. 12(a) to FIG. 12(e). If the number of antennas is 2, a resource element indicated by a number greater than 2, such as the numbers 3 and 4 indicated in FIG. 12(a) to FIG. 12(e), can be used for the purpose of transmitting data except a MIMO midamble or can be null.

Figure 13:
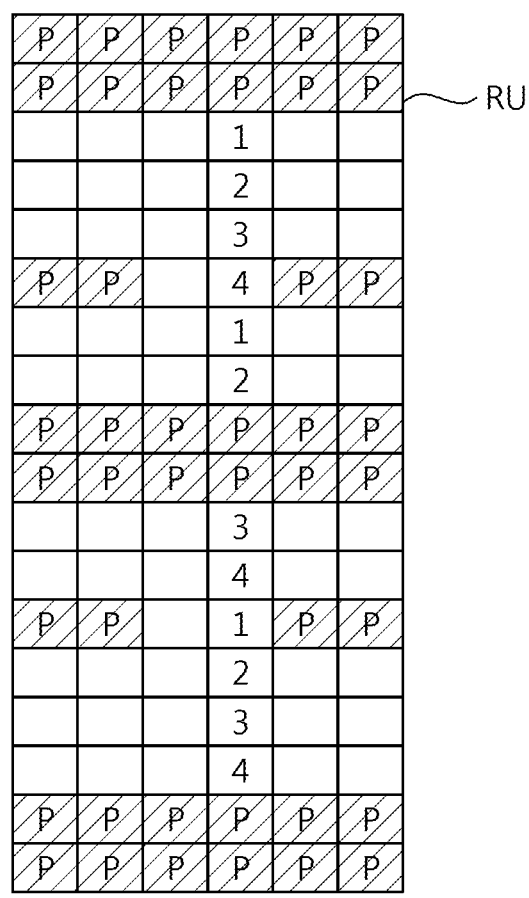
FIG. 13 and FIG. 14 show other examples of resource allocation of a MIMO midamble on an RU basis.
Figure 14:
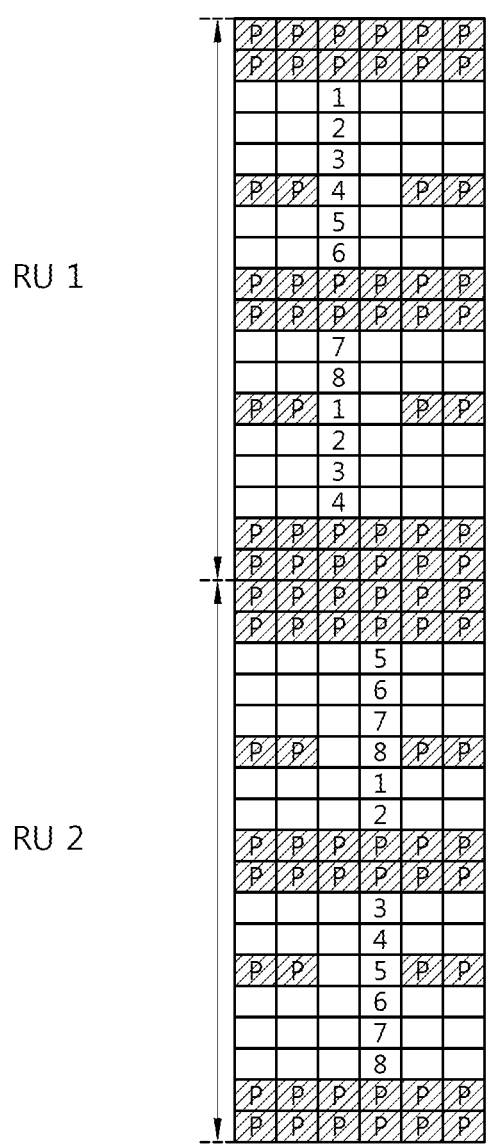

FIG. 13 and FIG. 14 show other examples of resource allocation of a MIMO midamble on an RU basis.

Referring to FIG. 13, three resource elements are allocated for each antenna (i.e., antennas 1 to 4) in one RU. Referring to FIG. 14, three resource elements are allocated for each antenna (i.e., antennas 1 to 8) in a unit of 2 RUs.

An RU to which the MIMO midamble described with reference to FIGS. 12(a) to (e), FIG. 13, and FIG. 14 is allocated can be arranged in various forms within a guard band. For example, the RU can be arranged in any one of forms shown in FIGS. 8(a) to (c). In this case, a MIMO midamble may be allocated on an RU basis such that the MIMO midamble is not allocated to a residue subcarrier, or the MIMO midamble may be allocated on a subcarrier basis such that the same MIMO midamble as that of a part of RU is allocated to the residue subcarrier.

Figure 15:
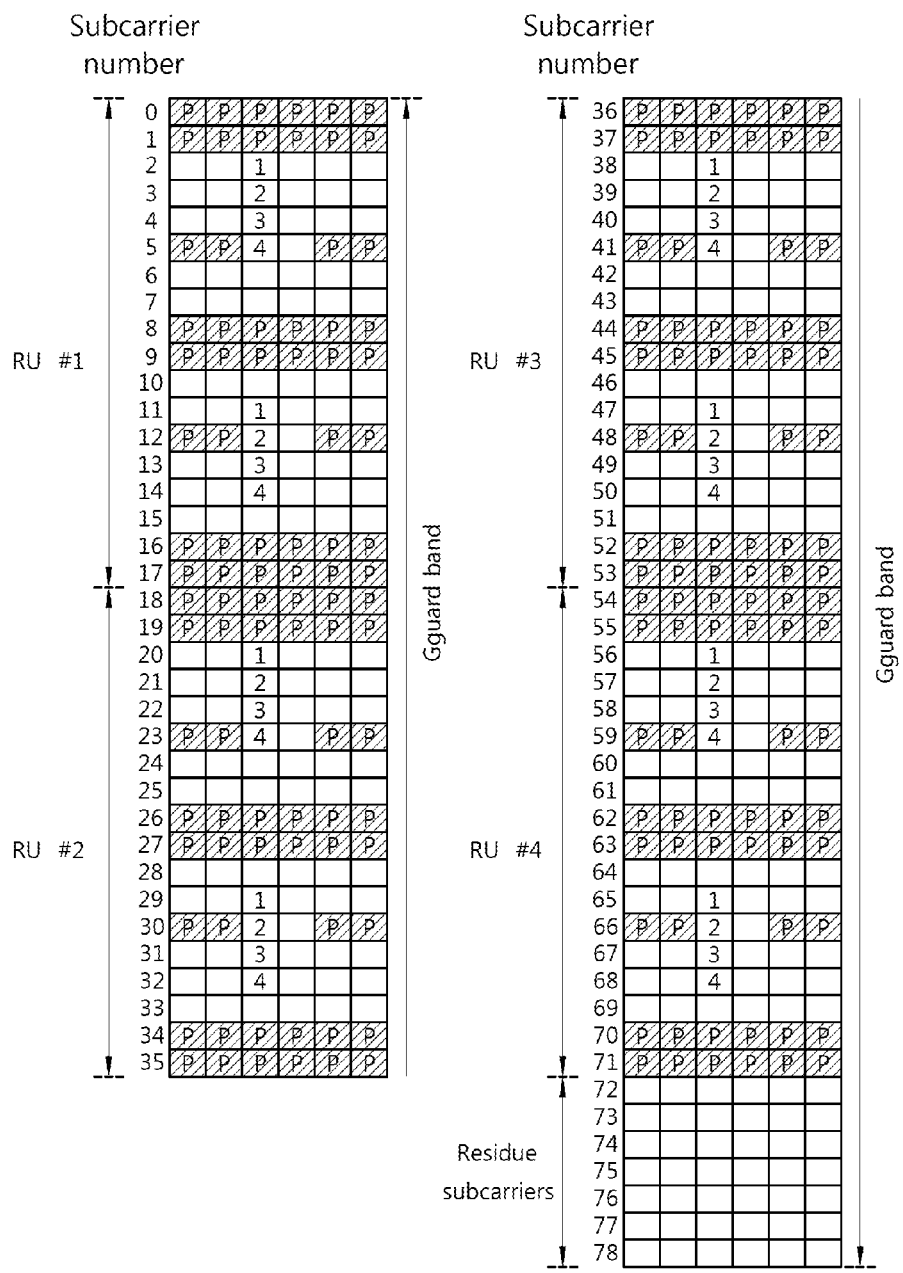
FIG. 15 and FIG. 16 show examples of resource allocation of a midamble on a guard band when carriers are contiguous and each carrier band is 5 MHz.
Figure 16:
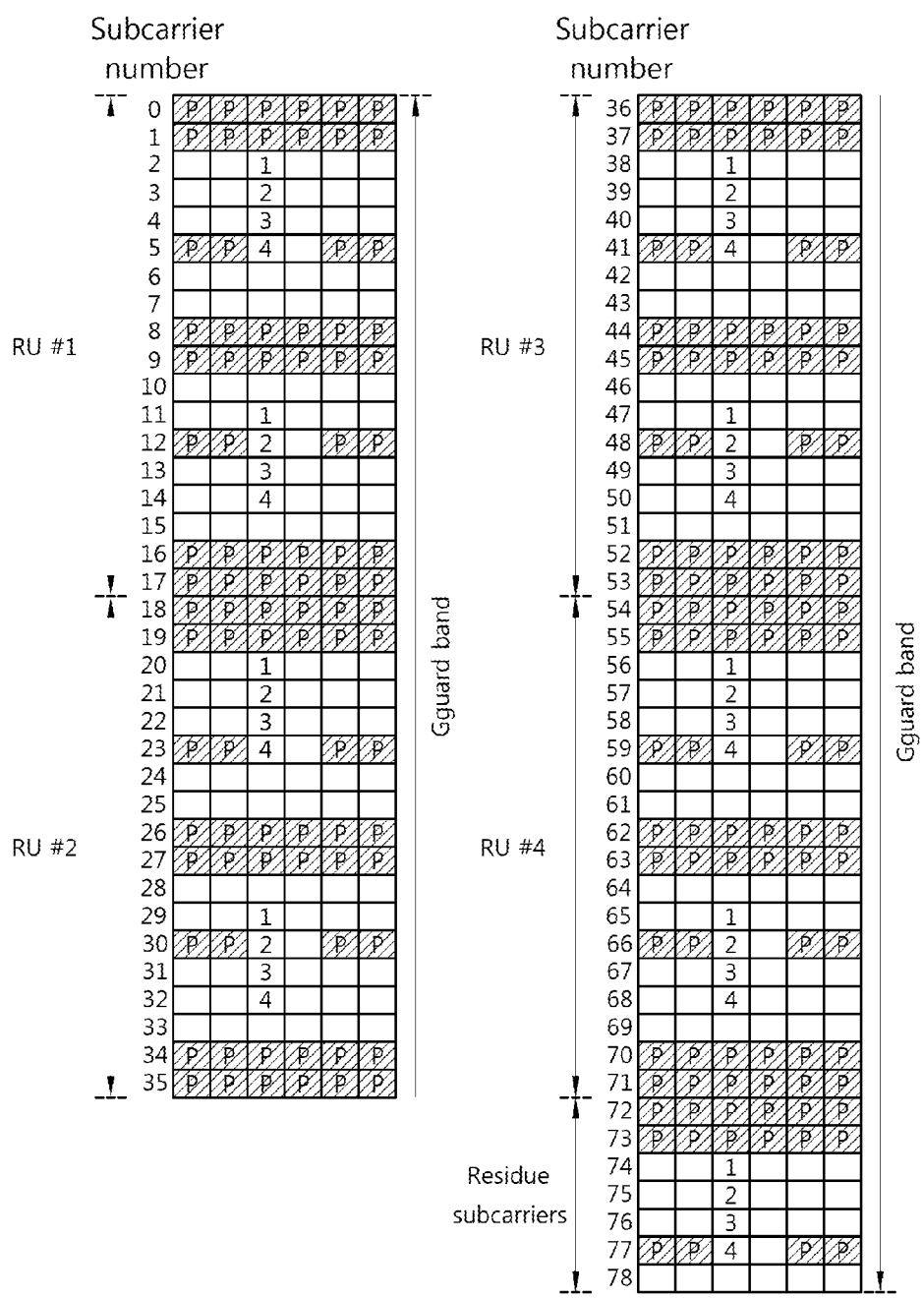

FIG. 15 and FIG. 16 show examples of resource allocation for a MIMO midamble in guard band when carriers are contiguous and each carrier band is 5 MHz.

Referring to FIG. 15, the MIMO midamble is allocated only to an RU of the guard band, and is not allocated to a residue subcarrier. That is, the residue subcarrier is left without change. Referring to FIG. 16, the MIMO midamble is allocated not only to an RU within a guard band but also to a residue subcarrier. That is, the MIMO midamble is allocated not on an RU basis but on a subcarrier basis. That is, in FIG. 15 and FIG. 16, the RU of FIG. 12(a) is arranged in the form of FIG. 8(a) (however, FIG. 13 is a case where the MIMO midamble is not allocated to the residue subcarrier, and FIG. 16 is a case where the MIMO midamble is allocated to the residue subcarrier). Likewise, it is apparent that any one of RUs of FIGS. 12(b) to (e) can be arranged as shown in any one of cases of FIGS. 8(a) to (c).

Figure 17:
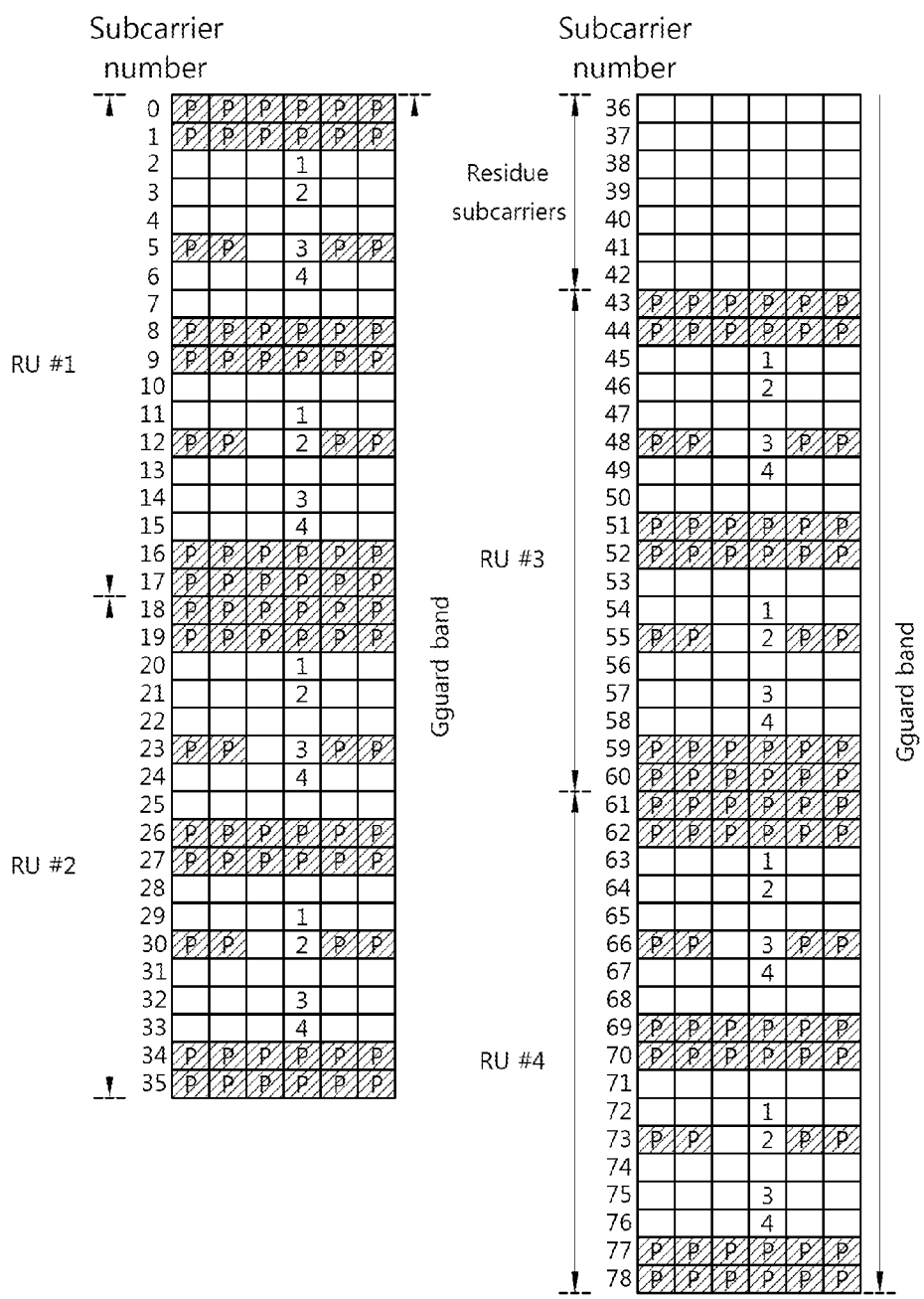
FIG. 17 and FIG. 18 show examples of configuring a MIMO midamble by arrange RUs of FIG. 12(d) within a guard band as shown in FIG. 8(b).
Figure 18:
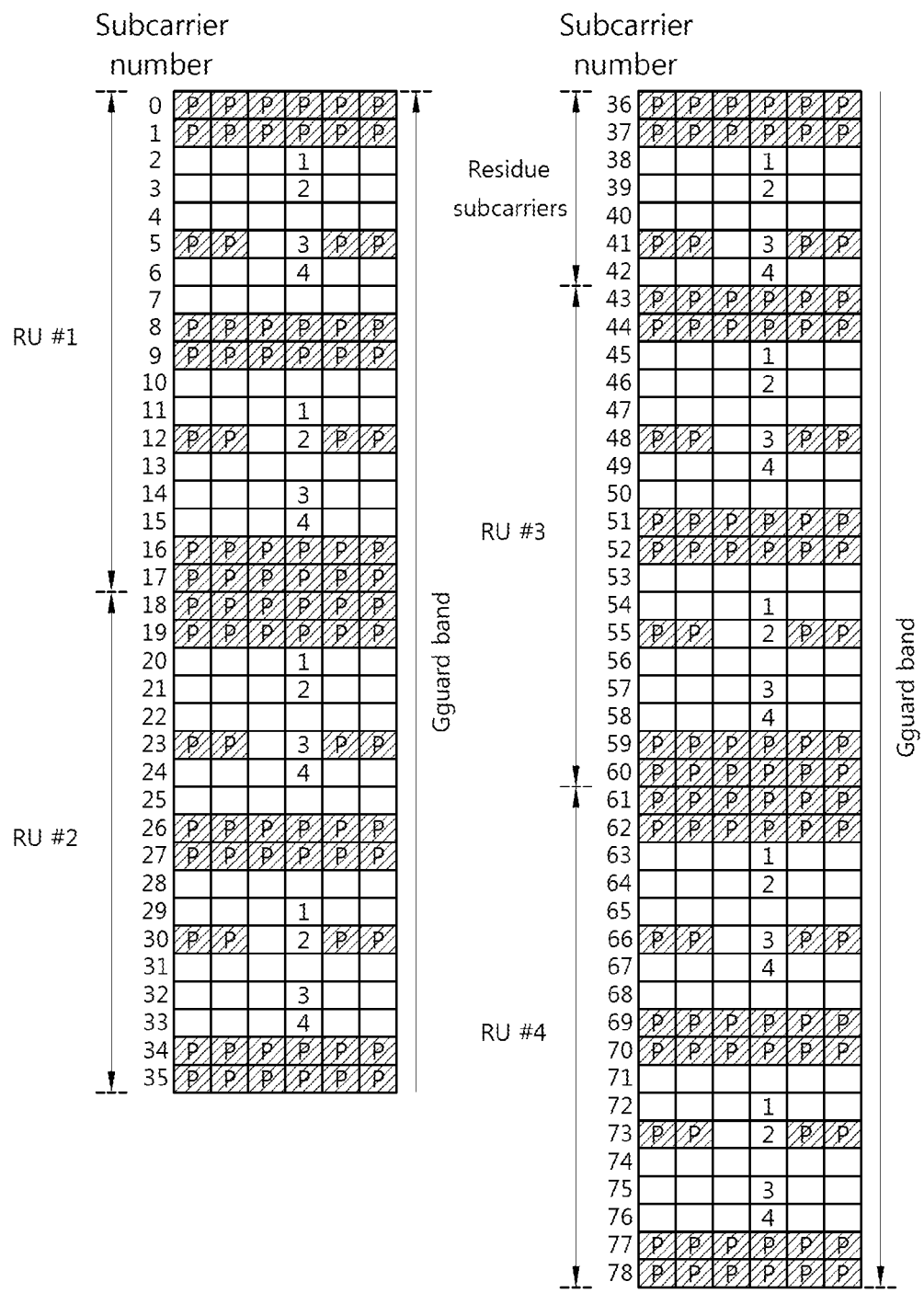

FIG. 17 and FIG. 18 show examples of configuring a MIMO midamble by arrange the RUs of FIG. 12(d) within the guard band as shown in FIG. 8(b) (herein, FIG. 17 is a case where the MIMO amble is not allocated to a residue subcarrier, and FIG. 18 is a case where the MIMO midamble is allocated to the residue subcarrier).

Referring to FIG. 17, the MIMO midamble is configured by using 8 subcarriers for each antenna in a guard band. For example, a MIMO midamble for an antenna 1 can be configured with a sequence having a length of 8 according to a permutation of subcarriers corresponding to subcarrier numbers 2, 11, 20, 29, 45, 54, 63, and 72. Referring to FIG. 18, a MIMO midamble is configured by using 9 subcarriers for each antenna in a guard band. For example, a MIMO midamble for an antenna 2 can be configured with a sequence having a length of 9 according to a permutation of subcarriers corresponding to subcarrier numbers 3, 12, 21, 30, 39, 46, 55, 64, and 73.

Although it has been described above that carriers are contiguous to each other for example, the present invention is also applicable to a case where the carriers are not contiguous to each other.

Figure 19:
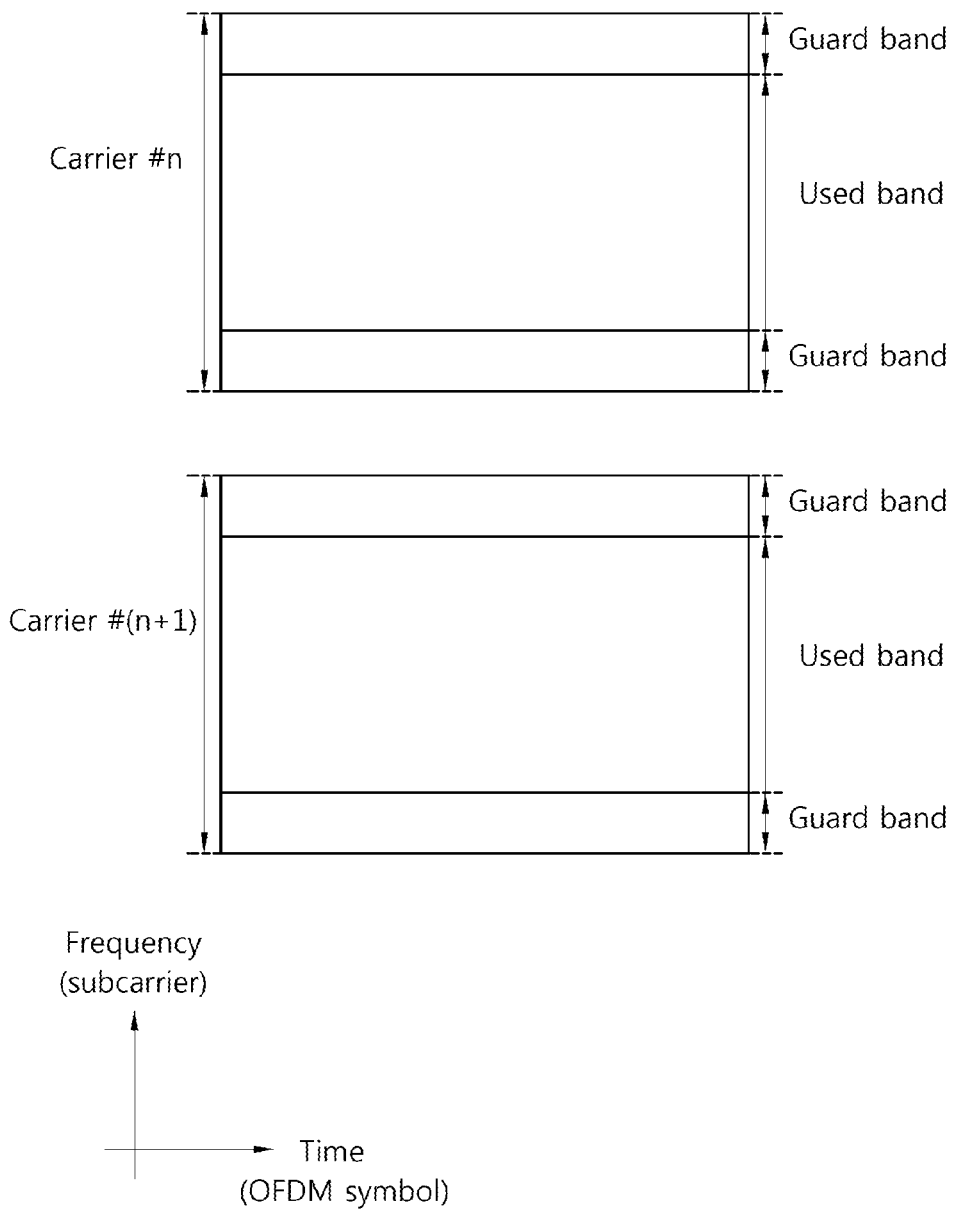
FIG. 19 shows a case where carriers are not contiguous to each other.

FIG. 19 shows a case where carriers are not contiguous to each other.

Referring to FIG. 19, when a carrier (e.g., a carrier #n) has any one of bands among 7, 8.75, and 10 MHz, the number of subcarriers of a guard band is equal to the number of subcarriers of a guard band of 5 MHz if the carriers are contiguous. Therefore, the MIMO midamble can be configured in the same manner as when a MIMO midamble is configured n the guard band of 5 MHz if the carriers are contiguous.

If the carriers are not contiguous and the carrier has a band of 20 MHz, the number of subcarriers is equal to that of a guard band for a case where the carriers are contiguous and the carrier has any one of bands among 7, 8.75, and 10 MHz. Therefore, the MIMO can be configured in the same manner as when a MIMO midamble is configured in a guard band used for a case where the carriers are contiguous and the carrier has one of bands among 7, 8.75, and 10 MHz.

If the carriers are not contiguous and the carrier has a band of 5 MHz, a guard band size to be applied is equal to a half size of a guard band used for a case where the carriers are contiguous and the carrier has a band of 5 MHz. If the carriers are not contiguous and the carrier has a band of 5 MHz, 24 RUs are included in a used band and 2 RUs are included in a guard band. If 3 subcarriers are allocated for each antenna in a MIMO midamble of each RU, a MIMO midamble sequence consisting of 72(=24×3) subcarriers is generated in the used band, and a MIMO midamble sequence consisting of 6(=2×3) subcarriers is generated in the guard band. That is, when using the MIMO midamble sequence of the used band, up to 72 cells or sectors can be identified, and when using the MIMO midamble sequence of the guard band, up to 6 cells or sectors can be identified.

If two subcarriers are allocated for each antenna in a MIMO midamble of each RU, a MIMO midamble sequence consisting of 48(=24×2) subcarriers is generated in the used band, and a MIMO midamble sequence consisting of 4(=2×2) subcarriers is generated in the guard band. That is, when using the MIMO midamble sequence of the used band, up to 48 cells or sectors can be identified, and when using the MIMO midamble sequence of the guard band, up to 4 cells or sectors can be identified.

An example of configuring an additional MIMO midamble for the guard band has been described above. If the MIMO midamble for the guard band is configured separately as described above, orthogonality is maintained but inter-cell interference avoidance may be not enough to satisfy required performance due to a short length of the MIMO midamble sequence. In this case, the MIMO midamble sequence may be configured by using a semi-orthogonal sequence. When configuring a separate MIMO midamble for the guard band, a UE can estimate a channel by detecting the MIMO midamble separately from each of the used band and the guard band.

On the basis of a midamble transmission method according to another embodiment of the present invention, a midamble (e.g., a MIMO midamble) can be configured by reusing a part of a midamble used in the used band in accordance with a length of the guard band. That is, a part of a midamble sequence used in the used band can be equally used in the guard band.

If a carrier band is 5 MHz, the number of RUs of the guard band may be 4, and the number of RUs in the used band may be 24. In this case, a part of a midamble sequence used in the used band is reused by segmenting it in accordance with 4 RUs. This method may have a problem in that orthogonality of a midamble is not maintained in the guard band. However, since there is no need to design a new midamble for the guard band, and the midamble of the used band can be directly used. Thus, this method has an advantage in that the conventional midamble detection method of the used band can be equally used. In addition, since a length of a midamble sequence becomes longer than that of a midamble only for the guard band, more accurate channel estimation is possible. The UE can perform channel estimation by using a midamble allocated across the used band and the guard band.

A cell-specific midamble sequence must use an orthogonal sequence so that a plurality of cell-specific midamble sequences can be transmitted through the same frequency band. A length of the orthogonal sequence used as the cell-specific midamble sequence may be determined according the number of pieces of cell information to be identified or the number of subcarriers occupied by one frequency band in a cell information region. For example, if the cell information region is allocated to one OFDM symbol in a time domain and when a frequency band consists of 18 subcarriers, then an orthogonal sequence having a length of up to 18 can be used as the cell-specific midamble sequence. The orthogonal sequence having a length of 18 can identify up to 18 pieces of cell information.

In a case where carriers are contiguous, if a carrier band is 5 MHz, 24 RUs are included in the used band, and 4 RUs are included in the guard band. If 3 subcarriers are allocated for each antenna in a midamble of each RU, a midamble sequence consisting of 72(=24×3) subcarriers is generated in the used band, and a midamble sequence consisting of 12(=4×3) subcarriers is generated in the guard band. That is, when using the MIMO midamble sequence of the used band, up to 72 cells or sectors can be identified, and when using the MIMO midamble sequence of the guard band, up to 12 cells or sectors can be identified.

If two subcarriers are allocated for each antenna in a midamble of each RU, a midamble sequence consisting of 48(=24×2) subcarriers is generated in the used band, and a midamble sequence consisting of 8(=4×2) subcarriers is generated in the guard band. That is, when using the midamble sequence of the used band, up to 48 cells or sectors can be identified, and when using the midamble sequence of the guard band, up to 8 cells or sectors can be identified.

Figure 20:
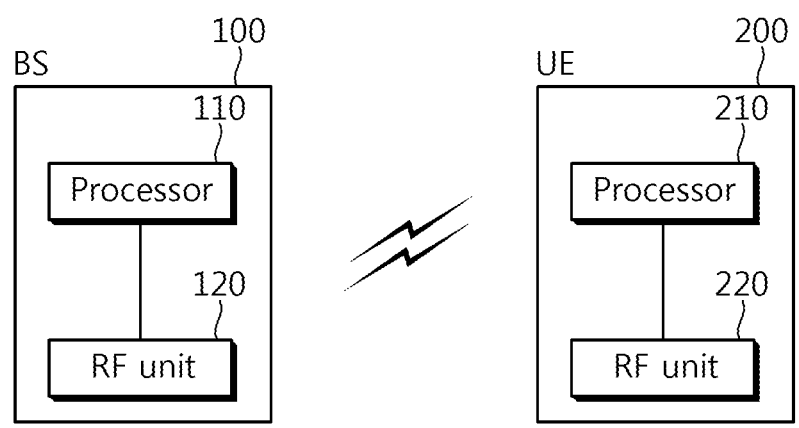
FIG. 20 is a block diagram showing a base station and a user equipment according to an embodiment of the present invention.

FIG. 20 is a block diagram showing a BS and a UE according to an embodiment of the present invention.

Referring to FIG. 20, a BS 100 includes a processor 110 and a radio frequency (RF) unit 120. The RF unit 120 transmits a radio signal including a midamble. The processor 110 is coupled to the RF unit 120 and performs resource allocation for the midamble. A UE 200 includes a processor 210 and an RF unit 220. The RF unit 220 can receive a radio signal including a midamble. The processor 210 is coupled to the RF unit 220, performs channel estimation from the radio signal including the midamble, and generates a feedback signal to be transmitted to the BS.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention. All trademarks are the property of their respective owners.

The invention claimed is:

1. A method for transmitting multiple input multiple output (MIMO) midambles in a radio communication system, the method comprising:
allocating a radio resource of a carrier for the MIMO midambles of multiple antennas; and
transmitting, from a base station to a mobile station, the MIMO midambles through the multiple antennas by using the allocated radio resource,
wherein the MIMO midambles includes sequences for distinguishing each of the multiple antennas such that the mobile station estimates a channel state for each of the multiple antennas,
wherein the carrier includes a plurality of resource units, each of which includes a plurality of subcarriers in a frequency domain and a plurality of orthogonal frequency division multiplexing (OFDM) symbols in a time domain,
wherein a resource element is defined as one subcarrier in the frequency domain and one OFDM symbol in the time domain,
wherein the carrier includes a used band including subcarriers allocated for transmitting a signal and a guard band including subcarriers allocated for preventing interference from occurring in the used band, and the MIMO midambles are allocated within the guard band, and
wherein the MIMO midambles are allocated to resource elements within the guard band, except for resource elements used for transmitting pilot signals for a channel estimation.

2. The method of claim 1, wherein the subcarriers of the guard band includes a subcarrier included in the resource units and a residue subcarrier not included in the resource units.

3. The method of claim 2, wherein the MIMO midambles are allocated only to the guard band.

4. The method of claim 3, wherein the MIMO midambles are allocated only to the resource units.

5. The method of claim 3, wherein the MIMO midambles are allocated to both the resource units and the residue subcarrier.

6. The method of claim 1, wherein the MIMO midambles are identical to a part of a midamble used in the used band.

7. The method of claim 1, wherein, if there is a plurality of carriers, the guard band is a specific frequency band contiguous between the plurality of carriers.

8. The method of claim 1, wherein the allocating of the radio resource of the carrier for the MIMO midambles comprise allocating an identifiable subcarrier group to a midamble of each of a plurality of cells.

9. The method of claim 1, wherein the MIMO midambles are allocated to only any one of a plurality of OFDM symbols included in a resource unit in the resource unit.

10. A method for receiving multiple input multiple output (MIMO) midambles in a radio communication system, the method comprising:
receiving, from a base station, radio resource information regarding a radio resource to which the MIMO midambles of multiple antennas are allocated in a carrier; and
receiving the MIMO midambles from the multiple antennas of the base station on the radio resource recognized from the radio resource information,
wherein the MIMO midambles includes sequences for distinguishing each of the multiple antennas of the base station such that a channel estimation for each of the multiple antennas is possible,
wherein the carrier includes a plurality of resource units, each of which includes a plurality of subcarriers in a frequency domain and a plurality of orthogonal frequency division multiplexing (OFDM) symbols in a time domain,
wherein a resource element is defined as one subcarrier in the frequency domain and one OFDM symbol in the time domain,
wherein the carrier includes a used band including subcarriers allocated for transmitting a signal and a guard band including subcarriers allocated for preventing interference from occurring in the used band, and the MIMO midambles are allocated within the guard band, and
wherein the MIMO midambles are allocated to resource elements within the guard band, except for resource elements used for transmitting pilot signals for a channel estimation.

* * * * *